Patented Apr. 15, 1941

2,238,684

UNITED STATES PATENT OFFICE 2,238,684

RESIN COMPLEX AND PROCESS OF MAKING SAME

Carleton Ellis, Montclair, N. J., assignor to Ellis-Foster Company, a corporation of New Jersey No Drawing. Application June 7, 1938,
Serial No. 212,303

5 Claims. (Cl. 260—42)

This invention relates to resin complexes of the mixed alkyd-urea-aldehyde type and the process of making them. In particular it relates to such complexes formed by the addition of urea to an aldehyde and an alkyd resin in aqueous medium, the water being removed from the resin complex thus formed. An object of the invention is to provide a useful method of making coating compositions and impregnating agents which are relatively inexpensive and which can be quickly dried to yield water-resistant films. Another object is to make light-colored complexes which yield light-colored, light-stable films. Other objects will be apparent from the description which follows.

It is known to combine alkyd resins with certain urea-aldehyde condensation products, but such processes have involved the use of an organic mutual solvent at the beginning of the reaction. Such solvents, especially when they are hydroxyl-containing (and in some cases ketonic) bodies, appear to enter into the reaction, and the resulting products owe their properties to this molecular modification by the hydroxyl-containing bodies. Alkyd resins such as those made with a large excess of polyhydric alcohol and therefore containing a high proportion of uncombined hydroxyl groups have been thus used, and particularly along with an alcoholic solvent body. In the present invention no organic solvent is used in the initial reaction; also, the alkyd resin need not be highly hydroxylated but may be, and preferably is, formed from substantially equivalent molecular proportions of polycarboxylic acid and polyhydric alcohol and also may be modified with monobasic acids.

The resin complexes herein described are prepared in the following preferred manner: The alkyd resin is added to an aqueous solution of an aldehyde, such as formaldehyde, and heated to about 95° C. Urea, preferably dissolved in a small amount of water, is then added and the mixture is heated under conditions such that the water distills off. If the residue is to be utilized at once in a coating composition, it is dissolved in a volatile organic solvent. A convenient manner of adding the solvent is to introduce it before all the water has been driven off and to distill the remaining water, preferably azeotropically, in the presence of the organic solvent, more solvent being added during and after the distillation, if necessary, to reach the desired concentration of resin in the final solution. On the other hand, if in the evaporation of the water the heating is continued beyond the stage where the residue is freely soluble in organic solvents, a solution (particularly in hydroxylated liquids) can be made by adding a small amount of strong acid such as hydrochloric or sulphuric to the mixture and gently heating. The added acid may be afterwards neutralized in order to stabilize the solution.

With formaldehyde as the aldehyde the amount necessary to combine with the urea and produce a homogeneous soluble final complex is at least 2½ moles per mole of urea. Although the amount used may be as high as 4 or 5 moles of formaldehyde, it is preferable to keep the formaldehyde to a minimum for economic reasons and also because free aldehyde may be present in the final solution or may be evolved during drying and produce objectionable odor.

The alkyd resin is preferably made, as mentioned above, from substantially equivalent amounts of polyhydric alcohol and polycarboxylic acid (or polycarboxylic acid plus monobasic acid). The amount of urea-aldehyde product in the resin complex depends somewhat upon the proportion of aldehyde used. With a minimum amount of formaldehyde the range of proportions is somewhat narrower than when an excess of formaldehyde is present. With 2½ moles of formaldehyde to 1 mole of urea, the proportion of urea-aldehyde that may be used is 15 per cent or more in the complex; and with about 4 moles of formaldehyde to 1 mole of urea, the range of proportion of urea-aldehyde is about 5 per cent or more. It may be mentioned that a urea-formaldehyde product, using 2½ moles of formaldehyde to 1 mole of urea, made in accordance with the present process but without an alkyd modifier, is opaque and does not appear to give a clear solution in organic solvents. However, as low as 5 per cent of alkyd modifier gives a clear soluble product. Also, it may be noted that as high as 95 per cent of alkyd material such as glycerol phthalate in the complex may show faster drying than the straight alkyd. Baking of the films is advantageous in shortening drying time and also in obtaining best water resistance. A feature of the soluble homogeneous resin complexes of the present invention is that no matter what the proportion of alkyd to urea-formaldehyde in the complex (in the range of 1 part urea-aldehyde and 19 parts alkyd to 19 parts urea-aldehyde and 1 part alkyd), they are all freely compatible with soluble alkyd resins such as are used in commercial coating compositions.

The useful polyhydric alcohols which enter the composition of the alkyd resins used herein are glycerol, the glycols and polyglycols including ethylene, diethylene, triethylene, propylene, dipropylene glycols; mannitol, sorbitol, pentaerythritol and mixtures thereof. Polycarboxylic acids (and their anhydrides where available) include phthalic, succinic, maleic, fumaric, citric, sebacic, adipic, malic, and various mixtures thereof, and of the alkyd resins prepared therefrom those from the unsaturated dibasic acids such as maleic, fumaric, citraconic and itaconic involve a preferred embodiment of the invention since they can be formed into compositions showing the most rapid hardening, as is illustrated here below.

The following examples are illustrative of the method of carrying out the invention. Parts are by weight.

Example 1.—Five hundred and thirty parts by weight of diethylene glycol (5 moles) and 490 parts maleic anhydride (5 moles) were heated in an inert atmosphere at 190° C. for 15 minutes and the temperature was then carried to 200° C. 21 parts of this alkyd were mixed with 80 parts of 37.5% formalin and heated to boiling. Fifteen parts of urea dissolved in an equal weight of water were slowly added to the formalin solution. The clear solution was dehydrated in vacuo at water bath temperature to yield a water white, viscous syrup which could be thinned with ethylene glycol monoethyl ether. A film baked at 150° C. for 30 minutes was hard, tough, tenacious, and water white. This product utilizes approximately 50% alkyd and 50% urea-formaldehyde with the formaldehyde equivalent to 4 moles to 1 mole of urea.

Example 2.—The procedure of Example 1 was repeated, using only 50 parts of 37.5% formalin (2½ moles formaldehyde to 1 mole of urea). The product when dissolved in glycol monoethyl ether was a water white, viscous syrup. A film baked as in Example 1 was clear, hard and tough.

Example 3.—One hundred and sixty parts of 37.5% formalin and 4.7 parts of the alkyd described in Example 1 were heated to boiling. Thirty parts of urea as a concentrated solution in water were slowly added to the formaldehyde, and the clear solution was dehydrated in vacuo at water bath temperature. This represents a urea-formaldehyde product modified with about 10% diethylene glycol maleate. A film poured on glass was baked at 150° C. for 30 minutes; it was water white and hard.

Example 4.—One hundred and fifty-two parts of propylene glycol (2 moles) and 196 parts of maleic anhydride (2 moles) were heated in an inert atmosphere up to 200° C. and held at that temperature for 10 minutes. 21 parts of this alkyd were mixed with 80 parts of 37.5% formalin and heated to boiling. Fifteen parts of urea dissolved in a small amount of water were slowly added and the solution was evaporated in vacuo at water bath temperature. When partly dehydrated, dioxan was added to the solution and dehydration was continued to yield a water white, viscous syrup. A film was baked at 150° C. for 30 minutes; it was water white, clear, hard, tough, and very tenacious.

Example 5.—Twenty-one parts of a commercial alkyd resin containing 29% drying oil acids (Rezyl 1102) and 80 parts of 37.5% formalin were heated to boiling. Fifteen parts of urea were dissolved in a little water and slowly added to the formaldehyde. The mixture was evaporated in vacuo at water bath temperature. When partly dehydrated, dioxan and ethyl lactate were added, and dehydration was continued to yield a clear, light yellow, viscous syrup. A film baked at 150° C. for 30 minutes was clear, light-colored, hard, and tough.

Example 6.—Twenty-five parts of adipic acid (0.17 mole) and 18.2 parts of diethylene glycol (0.17 mole) were heated together at 220–230° C. until a drop remained clear on cooling. Five parts of this alkyd and 19 parts of 37.5% formalin were heated to boiling when 3.5 parts urea, dissolved in a little formalin, were slowly added. The solution was immediately concentrated under vacuum at water bath temperature until a light yellow, clear, viscous syrup was obtained, soluble in glycol monoethyl ether.

Example 7.—A mixture of 444 parts of phthalic anhydride (3 moles) and 184 parts of glycerol (2 moles) was heated at 190–200° C. until a light colored, brittle resin was obtained. 47.5 parts of this resin were mixed with 9.6 parts of 37.8% aqueous formaldehyde and heated to boiling under a reflux condenser. 1.78 parts of urea dissolved in water were added and the clear solution then dehydrated at about 80° C. under reduced pressure until a viscous liquid was obtained. 100 parts of glycol monoethyl ether were added to give a lacquer of good brushing consistency which could be further diluted with xylol. A film upon baking in an oven at 150° C. for 40 minutes was hard and clear. This example utilizes substantially 95% alkyd and 5% urea-aldehyde compound.

Example 8.—To 588 parts of maleic anhydride (6 moles) was added 368 parts of glycerol (4 moles) and the mixture heated at 190°–200° C. until a light-colored hard resin resulted. 30 parts of this resin were mixed with 270 parts of 37.8% aqueous formaldehyde and heated to a gentle boil under a reflux condenser. 50 parts of urea dissolved in water were added slowly and when all had been added the clear solution was dehydrated at 80° C. under reduced pressure until a very viscous syrup resulted. 110 parts of dioxan were added and dehydration continued until 225 parts of lacquer were obtained. 86 parts of ethyl lactate were added to yield a lacquer of good brushing consistency. A film of this lacquer was baked at 150° C. for 20 minutes to give a hard, tough, water-clear coating.

Example 9.—Fifteen parts of the glycerol phthalate of Example 7 were mixed with 326 parts of 37.8% aqueous formaldehyde and heated to gentle boiling under a reflux condenser. 61 parts of urea dissolved in a small amount of water were added slowly. When all of the urea had been added and refluxing had been carried out for a few minutes longer, the clear solution was dehydrated at 80° C. under reduced pressure until a very viscous syrup remained. 110 parts of glycol monoethyl ether were added and dehydration continued until 200 parts of a clear lacquer solution were obtained. A film of the lacquer was hard and clear upon being baked at 150° C. in an oven for 20 minutes.

Example 10.—A mixture of 177 parts of succinic acid (1.5 moles) and 93 parts of ethylene glycol (1.5 moles) was heated at 210–220° C. for about 4 hours. 50 parts of the resin so obtained were heated with 120 parts of 37.8% aqueous formaldehyde to a gentle boil under a reflux condenser. 35.7 parts of urea dissolved in water were added slowly and the solution dehydrated at 80° C. under reduced pressure until a very viscous syrup remained. 110 parts of glycol monoethyl ether were added and dehydration continued until 200 parts of a lacquer solution were obtained. A film became hard upon baking in an oven at 150° C. for 45 minutes.

*Example 11.*—One hundred twenty-two parts of benzoic acid (1 mole) were heated with 184 parts of glycerol (2 moles) at 170–180° C. for ½ hour until a clear solution resulted, after which 245 parts of maleic anhydride (2.5 moles) were added and heating continued at 200° C. until a clear, hard resin was obtained. 65 parts of this resin were heated with 128 parts of 37.8% aqueous formaldehyde under a reflux condenser and 32 parts of urea dissolved in water added. Refluxing was continued for several minutes, then the clear solution was dehydrated under reduced pressure at 80° C. until a very viscous syrup remained. 110 parts of glycol monoethyl ether were added and dehydration continued until a clear lacquer of 50% solids was obtained. A film of the lacquer baked to a hard, clear coating in an oven at 150° C. in 20 minutes.

*Example 12.*—A mixture of 290 parts of fumaric acid, 106 parts of diethylene glycol and 92 parts of glycerol was heated to 200–210° C. until a clear resin had formed. 40 parts of this resin were brought to a gentle boil under a reflux condenser with 230 parts of aqueous formaldehyde, then 43 parts of urea dissolved in water slowly added. After refluxing for a few minutes, the batch was dehydrated to a very viscous liquid under reduced pressure and 110 parts of glycol ethyl ether were added. Evaporation was continued until a clear lacquer solution containing 50% solids was obtained. A film of this lacquer upon being baked in an oven at 150° C. for 20 minutes was hard, water-clear and tough.

*Example 13.*—Thirteen parts of the lacquer described in Example 9 were ground with 3.5 parts of titanium dioxide-barium pigment until a smooth paste was secured. The paste was thinned with ethyl lactate to form a white enamel of good working consistency. A film of this enamel on a steel plate baked in an oven at 150° C. for 20 minutes yielded a hard, pure white coating having excellent adhesion to the metal.

In recapitulation it is to be noted that the present invention involves mixed alkyl-urea-aldehyde resin complexes soluble in volatile solvents and suitable for quick-baking lacquers, impregnating solutions, adhesives and the like. The alkyd is formed from substantially equivalent amounts of alcoholic and acidic reactants whereby a greater degree of hardness and water-resistance is secured in the final film than when excess alcoholic substances are used. Also more rapid hardening results when the alkyd resin is produced from alpha-beta unsaturated polycarboxylic acids. The process consists in heating said alkyd resin with the aldehyde in aqueous medium and adding urea thereto as a concentrated aqueous solution. Addition of crystalline urea directly to an unneutralized aqueous formaldehyde solution causes local formation of a white precipitate which is difficult to dissolve, but this difficulty is not encountered when the urea is added as described. The amount of urea is equivalent to substantially 1 mole to at least 2½ moles, and preferably 3 to 4 moles of formaldehyde. No organic solvent is used in the reaction. Water is removed with the formation of a clear, very viscous residue which is soluble in solvents such as alcohols, glycol ethers and ethyl lactate or mixtures of such liquids with hydrocarbons, ketones or esters; or the reaction mixture may be concentrated to any stage desired, short of complete dehydration, and the water-containing product used for coatings and the like. With unsaturated alkyds such as maleic-polyhydric alcohol resins, addition of metallic compounds such as are used in varnishes, particularly soluble cobalt compounds, results in faster drying and increased water resistance. Pigments, dyes and fillers may be incorporated to form colored and/or opaque films and also other resins may be added such as alkyd or phenolaldehyde resins.

What I claim is:

1. The process of making a soluble, rapid-drying resinous complex which comprises heating in aqueous medium a mixture consisting of formaldehyde and a polycarboxylic acid-polyhydric alcohol condensation product, said condensation product being the reaction product of a mixture containing substantially equivalent amounts of acidic and alcoholic reactants, adding thereto an aqueous solution of urea equivalent to 1 mole of urea to at least 2½ moles of formaldehyde, and removing the water therefrom.

2. The process of making a soluble, rapid-drying resinous complex which comprises heating in aqueous medium a mixture consisting of formaldehyde and an alpha-beta unsaturated dicarboxylic acid-polyhydric alcohol condensation product, said condensation product being the reaction product of a mixture containing substantially equivalent amounts of acidic and alcoholic reactants, adding thereto an aqueous solution of urea equivalent to 1 mole of urea to at least 2½ moles of formaldehyde, and removing the water therefrom.

3. The process of making a soluble, rapid-drying resinous complex which comprises heating in aqueous medium a mixture consisting of formaldehyde and a monobasic fatty acid-polycarboxylic acid-polyhydric alcohol condensation product, said condensation product being the reaction product of a mixture containing substantially equivalent amounts of acidic and alcoholic reactants, adding thereto an aqueous solution of urea equivalent to 1 mole of urea to at least 2½ moles of formaldehyde, and removing the water therefrom.

4. The process of claim 2 in which the alpha-beta unsaturated dibasic acid is maleic acid.

5. The process of claim 3 in which the monobasic fatty acid comprises the acids obtained by hydrolysis of a drying oil.

CARLETON ELLIS.